United States Patent [19]

Takamoto et al.

[11] Patent Number: 5,210,679
[45] Date of Patent: May 11, 1993

[54] CUSTOMER'S POWER RECEIVING AND TRANSFORMING SYSTEM

[75] Inventors: Manabu Takamoto; Toyokazu Tanaka, both of Hitachi; Satoshi Miwada, Ibaraki, all of Japan

[73] Assignee: Hitachi, Ltd., Tokyo, Japan

[21] Appl. No.: 848,057

[22] Filed: Mar. 9, 1992

[30] Foreign Application Priority Data

Mar. 14, 1991 [JP] Japan .................. 3-073717

[51] Int. Cl.$^5$ .............................. A02B 1/04
[52] U.S. Cl. .................. 361/335; 200/48 R; 361/333
[58] Field of Search ............... 307/147, 148; 361/332, 361/333, 335, 341, 376, 379, 417, 419; 200/289, 48 R, 144 R, 148 B

[56] References Cited

U.S. PATENT DOCUMENTS

| | | | |
|---|---|---|---|
| 4,241,379 | 12/1980 | Olsen | 361/335 |
| 4,752,860 | 6/1988 | Romanet | 361/333 |
| 4,866,568 | 9/1989 | Eggebrecht | 361/333 |
| 4,866,569 | 9/1989 | Okumura | 361/335 |
| 4,967,307 | 10/1990 | Itou | 361/335 |

FOREIGN PATENT DOCUMENTS

1-136508 5/1989 Japan .
1-303002 12/1989 Japan .
2-254908 10/1990 Japan .

Primary Examiner—Gerald P. Tolin
Attorney, Agent, or Firm—Antonelli, Terry, Stout & Kraus

[57] ABSTRACT

A power receiving and transforming system comprising a gas insulated switchgear, with transformers being disposed adjacent the gas insulated switchgear and metal enclosed switchgear sections disposed on opposite sides of the transformers with respect to the gas insulated switchgear. The metal enclosed switchgear sections have metal enclosed switchgear units juxtaposed in a direction in which the gas insulated switchgear and the transformers are juxtaposed. The metal enclosed sections are located opposite to each other in a direction perpendicular to the direction of the juxtaposition. Therefore, the metal enclosed switchgear sections can be arranged so as to have a width equal to a width of the gas insulated switchgear and the width will not change even if the number of feeders in the metal enclosed switchgear sections is increased thereby enabling the entire power receiving and transforming system to be regularly installed at a site.

6 Claims, 7 Drawing Sheets

CUSTOMER'S POWER RECEIVING AND TRANSFORMING SYSTEM

BACKGROUND OF THE INVENTION

The present invention relates to a power receiving and transforming system and, more particularly, to a power receiving and transforming system of two-circuit power reception, two-bank type for distributing electric energy to feeders by way of a plurality of metal-enclosed switchgear.

Due to the cost of land, a power receiving and transforming system has been improved in various ways to decrease an installation space. More particularly, a gas insulated switchgear (hereinafter GIS) has been proposed in which an excellent insulation property of $SF_6$ gas is effectively utilized. Since the installation space can be largely reduced and the reliability can be also improved in comparison with a conventional air-insulation transforming system, most of the power receiving and transforming systems include GISs.

GISs have been further reduced in size as a result of various technical researches. For example, in a system of two-circuit power reception, two-bank type which is a standard skeleton for a large customer, as disclosed in Japanese Patent Unexamined Publication No. 1-303002, it is possible to decrease a GIS in size so as to be transportable as a fully assembled apparatus. Moreover, a transformer (hereinafter TR) and a metal-enclosed switchgear (hereinafter MCS) have been each reduced in size.

Figure 11:
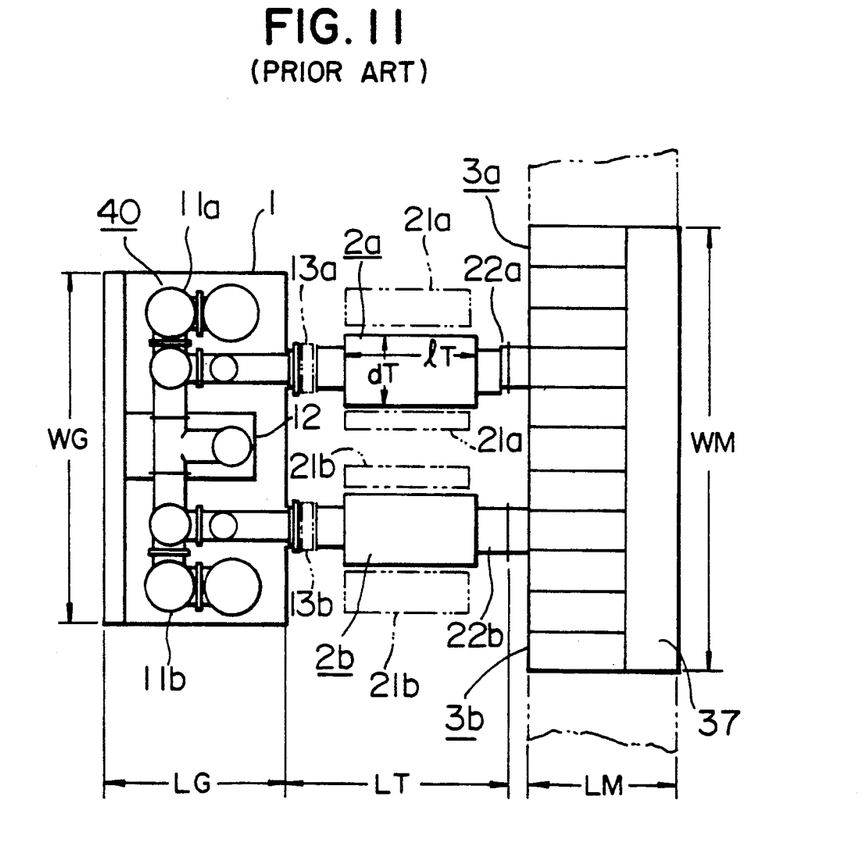
FIG. 11 is a plan view of a conventional power receiving and transforming system.

As shown in FIG. 11, a width WG and a length LG of a GIS 40 which is transportable as a fully assembled apparatus are determined by dimensions of a trailer. In general, the width WG is about 6000 mm, and the length LG is about 3200 mm. Also, FIG. 11 schematically shows TR's 2a, 2b of which body has dimensions dT×lT except for cooling devices 21a, 21b. The length of the TRs 2a, 2b is perpendicular to the widthwise direction of the GIS 40. Connection buses of the TRs 2a, 2b are respectively connected to the GIS 40 through connecting portions 13a, 13b. Consequently, a transportation or installation length LT of the TR 2a, 2b is relatively large due to the longitudinal dimension lT of the bodies. Further, a plurality of MCS's 3a, 3b, which are connected to the two TRs 2a, 2b through connecting portions 22a, 22b, have MCS units juxtaposed along the widthwise direction, so that the MCSs have a juxtaposition width WM and a length LM.

In the power receiving and transforming system of this structure, a plurality of MCSs 3a, 3b are located to have their units juxtaposed in one line, so that an area of a site for installing the system is determined by the width WM of the MCSs 3a, 3b. Therefore, in spite of the size reduction of the GIS 40, a relatively large site is necessary, and it is difficult to utilize the land effectively. This disadvantage is induced because the developments of component apparatus for the purpose of the size reduction have been individually conducted and size reduction of the system as a whole has never been tried.

SUMMARY OF THE INVENTION

An object of the present invention is to provide a customer's power receiving and transforming system which can be entirely installed at a site even if the number of juxtaposed MCS units is increased, to thereby utilize the land effectively.

In order to achieve this object, the invention provides a customer's power receiving and transforming system comprising a GIS, a TR on one side of which the GIS is provided, and an MCS disposed on the other side of the TR. The MCS is divided into two sections to have units juxtaposed along a direction of juxtaposition of the GIS and the TR, and that the two sections of the MCS are located opposite to each other along a direction perpendicular to the direction of juxtaposition.

With the above-described structure, the power receiving and transforming system according to the invention differs from the conventional receiving and transforming station in that the width of the whole MCS is, at the minimum, equal to a width of two conventional MCS's which are substantially juxtaposed. Even if the number of feeders is increased, the MCS suffices to be installed more in the direction of juxtaposition while its width corresponds substantially to that of the GIS. Thus, the entire system can be regularly installed in a site, thereby utilizing the land effectively.

DESCRIPTION OF THE PREFERRED EMBODIMENTS

Figure 2:
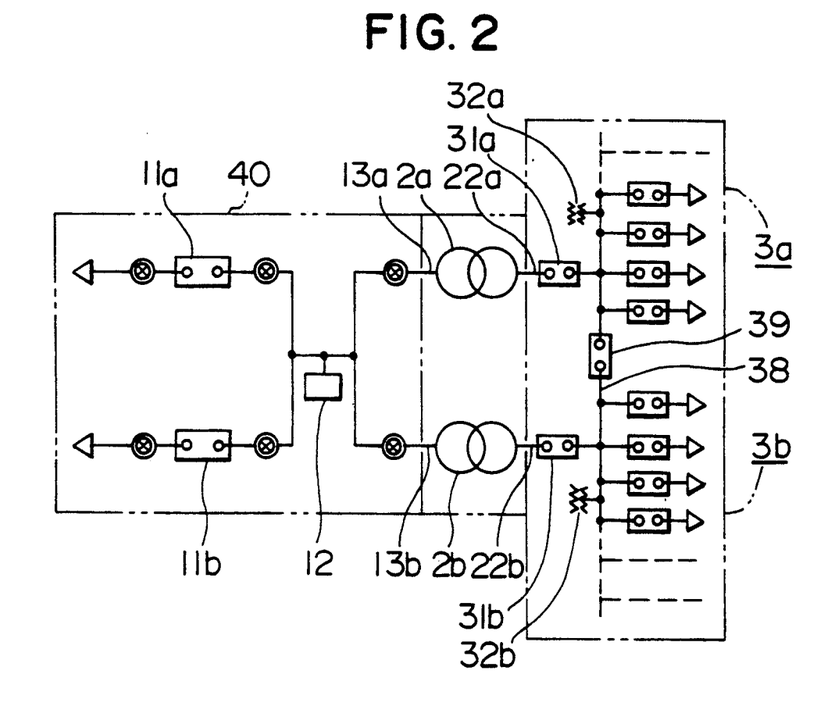
FIG. 2 is a schematic circuit diagram showing one example of a skeleton to which the invention is applied.

Referring to FIG. 2, described a standard skeleton of a large customer's power receiving and transforming system for general industries includes a GIS 40 having a two-circuit service entrance switch comprising breakers 11a, 11b on both sides of which disconnectors are provided. Electric power is usually supplied to the GIS 40 at 66/77 kV from an electric energy company. Consumed power is measured by a measuring device 12 through which the GIS 40 is connected to TRs 2a, 2b by connecting portions 13a, 13b. Normally, the voltage is decreased to 6.6 kV by the TRs 2a, 2b, and supplied to MCS sections 3a, 3b of two systems corresponding to the TRs 2a 2b. The MCS sections 3a, 3b are connected to the TRs 22a, 2b by connecting portions 2a, 22b. A plurality of feeders are connected to each of the systems which are connected by a communication bus 38 and a communication breaker 39. In general, the MCS sections 3a, 3b include breakers 31a, 31b on the side of the TRs 2a, 2b and a common bus on the other side. Potentiometers 32a, 32b and a plurality of feeders comprising breakers and insulated leading means such as cables are connected to the common bus.

Figure 1:
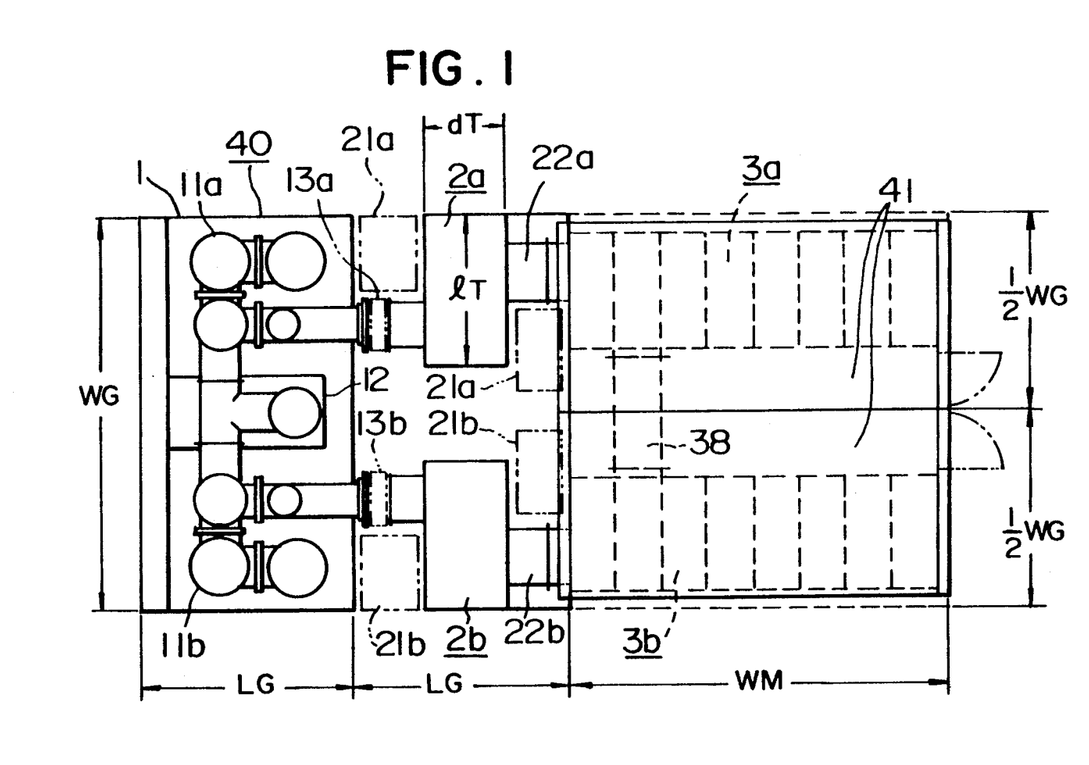
FIG. 1 is a plan view of a power transforming and receiving system according to one embodiment of the present invention.

As shown in FIG. 1, the GIS 40, the breakers 11a, 11b are disposed in an opposed relationship, and the measuring device 12 is connected to terminals of the breakers 11a, 11b on one side in a similar manner as shown in FIG. 11. Although connections between the GIS 40 and the TRs 2a, 2b can be effected by the connecting portions 13a, 13b with power cables or gas-insulation buses, connections by use of gas-insulation buses are described here because freedom in design with respect to the arrangement is granted in the case of power cables. The GIS 40 is mounted on a substantially rectangular base 1 having a width WG and a length LG. The GIS for especially high tension power can be designed within a dimensional limit for transportation by a trailer so as to be transportable as a fully assembled apparatus. On the other hand, bodies of the TRs 2a, 2b are disposed in such a manner that the length indicated by IT is in parallel to the WG of the GIS 40, and that the width of the TR indicated by dT is in parallel to the length of the GIS 40 indicated by LG. Therefore, an overall width LG of the TRs 2a, 2b is equal to the length LG of the GIS 40 so as to make them transportable as fully assembled apparatus. Connections between the TRs 2a, 2b and the MCS sections 3a, 3b are effected by two parallel gasinsulation buses provided with the connecting portions 22a, 22b. In a remaining space in a vicinity of the connecting portions, cooling devices 21a, 21b for the TRs 2a, 2b are installed.

Figure 3:
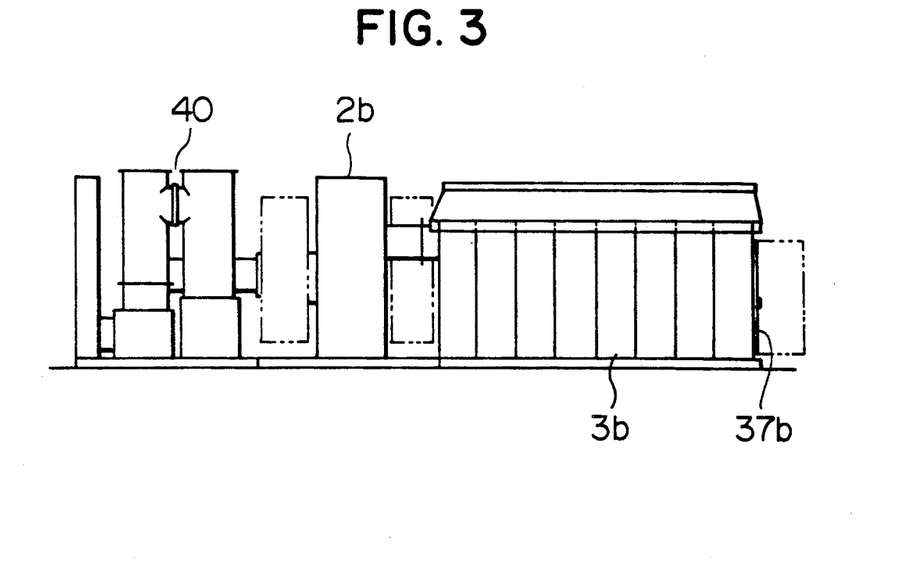
FIG. 3 is a front view of the power transforming and receiving system shown in FIG. 1.
Figure 4:
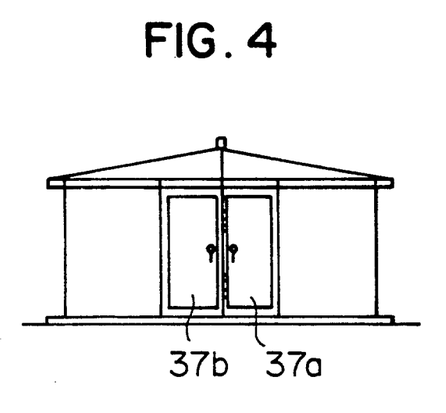
FIG. 4 is a side view of the power transforming and receiving system shown in FIG. 3.

Referring to FIGS. 3 and 4, the MCS sections 3a, 3b, located on the side of the TRs 2a, 2b which is opposite to the side where the GIS is provided are of an indoor type. The two MCS sections 3a, 3b are divided by a pair of doors 37a, 37b in a direction which MCS units are juxtaposed, as shown in FIG. 4, and are integrally connected with each other after installation. The overall dimensions of the MCS are greater than those of the GIS 40 and the TR's 2a, 2b, as shown in FIG. 1. Consequently, the MCS is divided into two sections in such a manner that each MCS section has a length (WG/2) while it has a width WM. As a result, in the same manner as the GIS 40, each of the MCS sections 3a, 3b will have dimensions within the transportation limit so as to be transportable as a fully assembled apparatus. In this embodiment, the width WM of the MCS sections 3a, 3b in a direction, along which they are juxtaposed, is within the transportation limit. If such limit is exceeded, however, the MCS sections 3a, 3b may be further divided to reduce the width to enable the transportation. The two divided MCS sections 3a, 3b, provide passages 41 (FIG. 7) for an operator on to enter from either of the doors 37a, 37b shown in FIG. 4. The passages 41 form be an enlarged common passage of a housing after the assembly. In other words, the divided MCS sections 3a, 3b are located opposite to each other with the common passage 41 interposed therebetween. Since the MCS sections 3a, 3b contain various devices which are provided within casings having doors, as well known, the common passage 41 is used as a space for maintenance and inspection of the MCS sections 3a, 3b. The TRs 2a, 2b and the MCS sections 3a, 3b are generally connected by air-insulation bus ducts or power cables, and connections by use of air-insulation bus ducts are described here. As shown in FIG. 2, two systems of the MCS sections 3a, 3b are connected by the communication bus 38 and the communication breaker 39. The communication bus 38 is located above in the common passage 41 so as to connect the MCS sections 3a, 3b, and the communication breaker 39 is installed, as an MCS unit, within one casing. This will be described next referring to structural examples shown in FIGS. 5 and 6.

Figure 5:
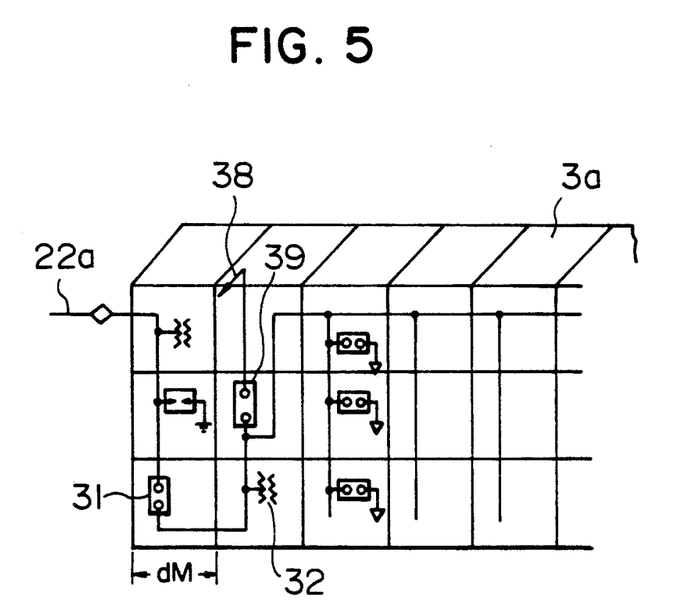
FIG. 5 is a perspective view of a MCS section shown in FIG. 1 with a schematic circuit diagram.

FIG. 5 is a perspective view of the MCS section 3a comprising MCS units constructed such that component devices are provided within casings which are stacked in three layers. The MCS units which are the closest to the TR 2a contain the breaker 31 and so forth which are connected to the secondary side of the TR 2a, and MCS units which are next to the MCS units closest to the TR 2a contain a potentiometer 32, the communication breaker 39 and so forth. Further, the MCS units closest to the TR 2a contain breakers which are stacked and constitute feeders of the same system so that each unit has one feeder.

Figure 6:
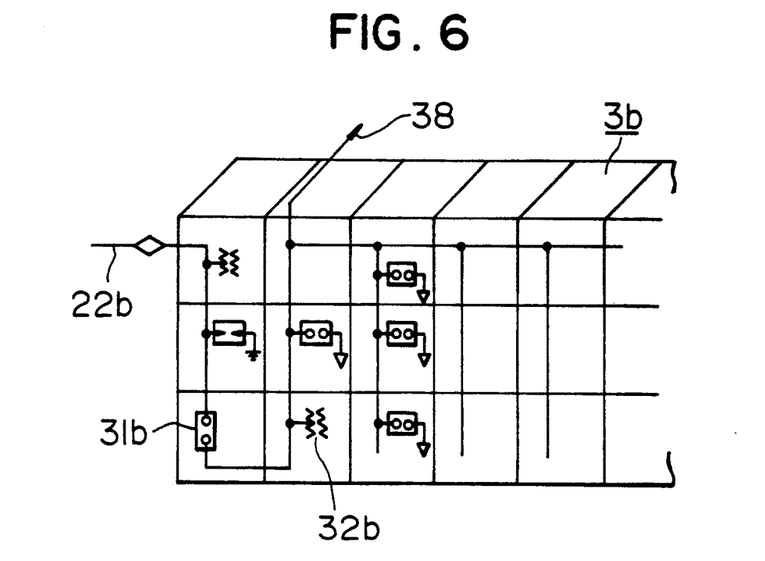
FIG. 6 is a perspective view of a MCS section shown in FIG. 1, with a schematic circuit diagram.

As shown in FIG. 6 is a perspective view of the MCS section 3b comprises MCS units constructed such that component devices are provided within casings which are stacked in three layers in the same manner as the above example. The communication bus 38 for connecting the MCS sections 3a, 3b via the communication breaker 39 is provided in such a manner so as to connect the second MCS units from those next to the TR 2b. Except for these second MCS units, therefore, the MCS section 3a and the MCS section 3b can be arranged to have substantially the same construction. In order to improve this arrangement, the second MCS units in the MCS section 3b shown in FIG. 6 next to those adjacent to the Tr 2b may be such that the control one among the stacked casings is empty. In general, casings for especially high tension power stacked in three layers have a width dM of about 700 mm. Therefore, eight MCS units can be juxtaposed when the overall width WH of the MCS section 3a or the MCS section 3b is restricted to the transportation limit of 6000 mm.

As described so far, the entire power receiving and transforming system shown in FIGS. 1 to 6 can be installed at a site, thereby utilizing the land effectively. Besides, the lengths of the bodies of the TRs 2a, 2b are substantially perpendicular to a direction, along which the GIS 40, the TRs 2a, 2b and the MCS sections 3a, 3b are juxtaposed, so that the two TRs 2a, 2b can also have the width WG and the length LG as the GIS 40 and can be constructed within the transportation limit. Therefore, when the system is transported to a site, four trailers suffice such that the GIS 40 integrally on one trailer, the TRs 2a, 2b integrally on another trailer, and the MCS sections 3a, 3b separately on two trailers. Moreover, the passage 41 serving as the maintenance/inspection space is formed at a portion where the MCS sections 3a, 3b confront each other, and consequently, the site of a small area can be utilized efficiently. Also, only the communication bus 38 is located above in the passage 41, and the communication breaker 39 is installed as a part of the MCS, so that the passage 41 can have a volume large enough though the communication bus 38 is disposed therein.

Figure 7:
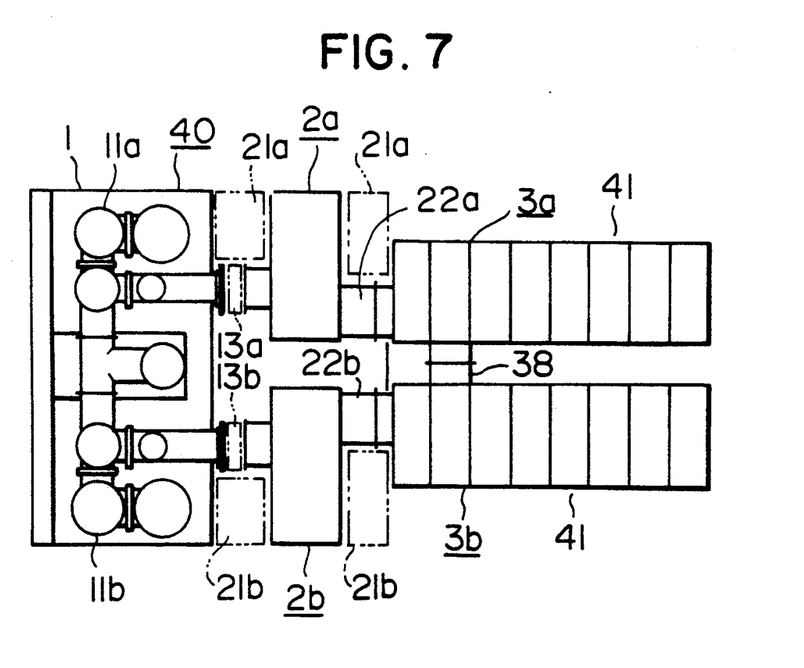
FIG. 7 is a plan view of a power receiving and transforming system according to another embodiment of the invention.

In FIG. 7, the GIS 40 and the TRs 2a, 2b have the same construction as those of the first embodiment so that the explanations thereof will be omitted. Only the MCS sections 3a, 3b which have different structures will be described.

The MCS sections 3a, 3b in each of which MCS units are juxtaposed are located opposite to each other in the same manner as the first embodiment. However, casings of these MCS units have doors on the outside, so that the units in the MCS section 3a and those in the MCS section 3b will be opened in opposite directions and checked from opposite sides. With this arrangement, the gap between these two MCS sections 3a, 3b can be made reduced, and, accordingly, the axial length of the communication bus 38 for connecting the MCS sections 3a, 3b can be shortened. In this case, the locations of the connecting portions 22a, 22bh between the TRs 2a, 2b and the MCS sections 3a, 3b are some modified, and the cooling devices 21a, 21b for the TRs 2a, 2b are disposed on the outsides of the connecting portions 22a, 22b.

Figure 8:
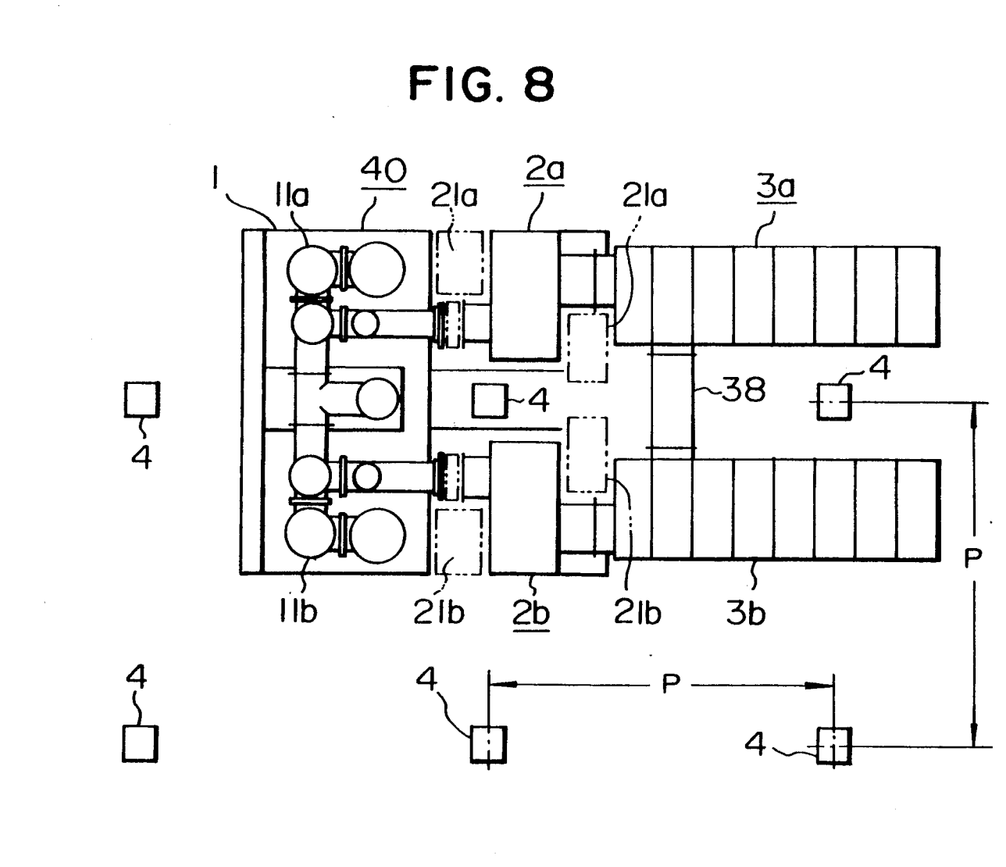
FIG. 8 is a plan view of a power receiving and transforming system according to a further embodiment of the invention.

The power receiving and transforming system of FIG. 8, is provided in an a includes the GIS 40, the TRs 2a, 2b and the MCS sections 3a, 3b having the same constructions as the embodiment of FIG. 1, so that the explanations thereof are omitted.

Since columns 4 are inevitably provided upon construction of the building, the arrangement of the system is restricted. As shown in FIG. 8, however, the columns can be provided in spaces between the two TRs 2a, 2b and between the two MCS sections 3a, 3b. In general, an interval P between the columns 4 is 5000 to 6000 mm, and particular inconvenience is not caused in the case of a system for especially high tension power.

Figure 9:
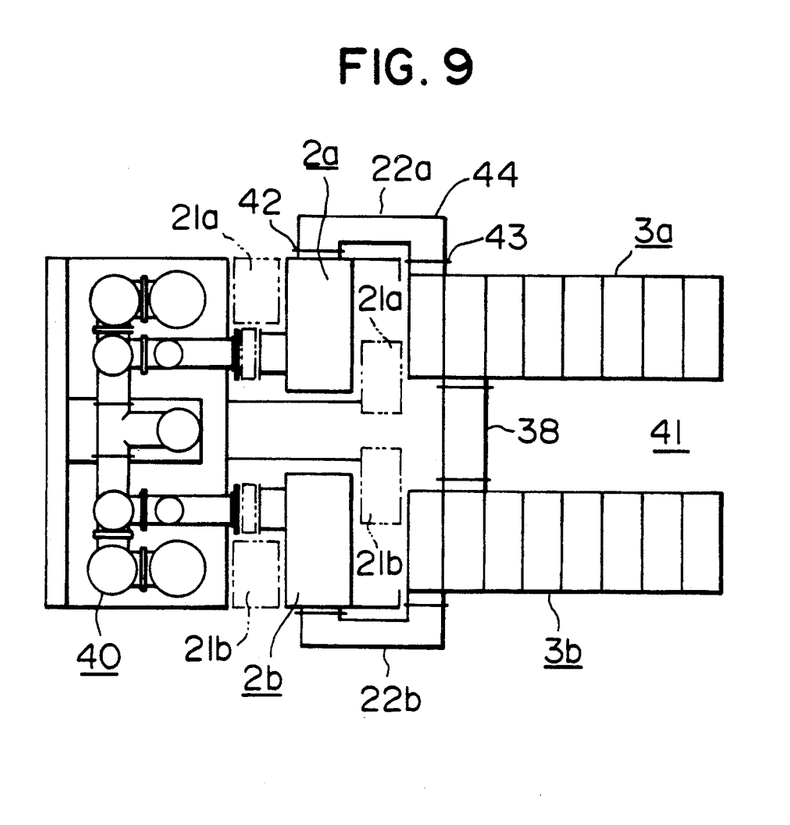
FIG. 9 is a plan view of a power receiving and transforming system according to yet another embodiment of the invention.

In the power receiving and transferring system of FIG. 9, the connecting portions 22a, 22b for connecting the TRs 2a, 2b and the MCS sections 3a, 3b are modified for reasons of the installation operation of the entire system. In the case where the connecting portions 13a, 13b, 22a, 22b are disposed straight in a direction, along which the GIS 40, the TRs 2a, 2b and the MCS sections 3a, 3b are juxtaposed, as in the embodiments described before, the procedures of installation operation at the actual site must be sequentially performed in one direction. For example, if the GIS 40 is installed first, the TRs 2a, 2b must be installed next, and finally, the MCS s 3a 3b must be installed. In the embodiment of FIG. 9, therefore the TRs 2a, 2b and the MCS sections 3a, 3b are connected in a direction, perpendicular to a direction, along which the GIS 40 and the TRs 2a, 2b are juxtaposed. More specifically, connection holes 42 are formed at one longitudinal end of the body of each Tr 2a, 2b, while connection holes 43 are likewise formed in each MCS section 3a, 3b so as to be open in a direction perpendicular to a direction, along which the MCS sections are juxtaposed, and each pair of these connection holes 42, 43 are connected by a substantially U-shaped connection bus 44. As for the transportation of the component apparatus, the additionally provided connection buses 44 exceed the transportation limit, and therefore, are disassembled from the apparatus during the transportation so that they can be connected to the apparatus at the site. Consequently, according to the embodiment of FIG. 9, installation operations of the component apparatus can be conducted simultaneously, and also, a space can be obtained for installation of the cooling devices 21a, 21b for the TRs 2a, 2b.

In each of the above embodiments, a power receiving and transforming system for particularly high tension power is described in view of the transportation limit. However, the invention is not restricted to the system of such capacity. If the transportation limit is not taken into account, the structures of the TRs 2a, 2b shown in FIG. 11 can be applied to the above embodiments to thereby obtain the same effects.

Figure 10:
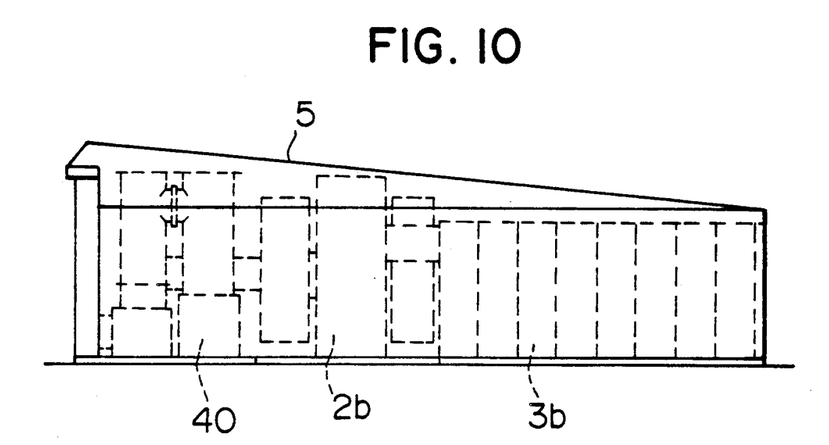
FIG. 10 is a front view of a power receiving and transforming system according to a still further embodiment of the invention.

In recent years, a power receiving and transforming system is often installed in the suburbs of cities, and, consequently, it is necessary to harmonize the system with the environment in order to soothe apathetic feelings of residents in the neighboring region or for such reasons. In the embodiment of FIG. 10, the entire system described in the above embodiments is covered with a transformer substation shelter 5. Since the system is arranged to be regularly installed at a site, as described previously, it is easy to construct a transformer substation shelter fitted for the system, and also, the entire system can be covered with the shelter effectively. Besides, an unfavorable image as a transformer substation can be improved to thereby provide a power receiving and transforming system in excellent harmony with the environment.

In the present invention, as described heretofore, the MCS, located on the side of the TRs opposite to the GIS, is divided into two confronting sections so that MCS units are juxtaposed in a direction, along which the GIS and the TRs juxtaposed. Consequently sequence, even if the number of MCS units is increased, only the length of the substantially rectangular system is enlarged, and therefore, the entire system can be regularly installed at a site, thus utilizing the land effectively and reducing the construction costs of the system.

What is claimed is:

1. A power receiving and transforming system comprising:
    a gas insulated switch gear;
    transformers disposed adjacent said gas insulated switchgear; and
    a plurality of metal-enclosed switch gears disposed on a side of said transformers opposite to said gas insulated switch gear,
    wherein said metal-enclosed switchgears are divided into first and second sections each of said first and second sections comprising a plurality of metal enclosed switch gear units arranged in rows and juxtaposed with fronts of the respective metal enclosed switchgear units facing in the same direction, the direction of said rows of said first section and the direction of said rows of said second section are in parallel to each other and correspond to a direction in which said gas insulated switchgear and said transformers are juxtaposed, said first and second sections being disposed such that, in a direction perpendicular to the direction of said rows, said fronts of said first and second sections confront each other or surfaces of said first and second sections opposite to said fronts confront each other.

2. A power receiving and transforming system according to claim 1, wherein passage means for maintenance/inspection are formed at a location where said first and second sections confront each other.

3. A power receiving and transforming system according to claim 1, wherein each of said metal-enclosed switchgear units includes a plurality of feeders connected by a communication breaker and communication bus, said communication bus being disposed above at a location where said first and second sections confront each other.

4. A power receiving and transforming system according to claim 3, wherein said communication breaker is provided in that portion of one of said first and second sections confronting said communication bus.

5. A power receiving and transforming system according to claim 1, wherein said transformers include two transformers provided side by side in a direction perpendicular to a direction in said gas insulated switchgear and said transformers are juxtaposed, said two transformers and said first and second confronting sections of the metal-enclosed switchgear having gaps therebetween, in which columns are installed.

6. A power receiving and transforming system according to claim 1, wherein said transformers includes two transformers located in such a manner that a length of their bodies of the two transformers are perpendicular to a direction in which said gas insulated switchgear and said transformers are juxtaposed.

* * * * *